W. V. TURNER.
ELECTROPNEUMATIC BRAKE DEVICE.
APPLICATION FILED NOV. 10, 1910.
1,131,968.
Patented Mar. 16, 1915.
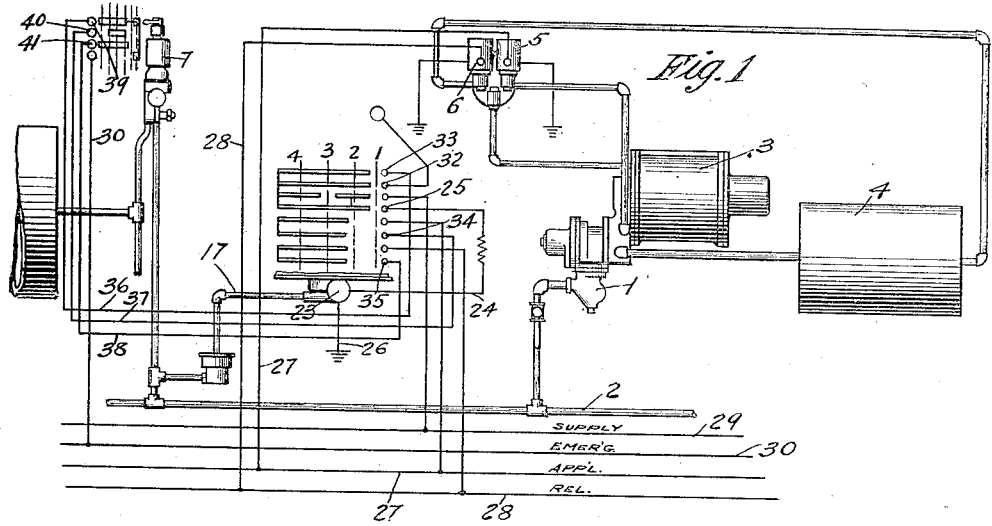
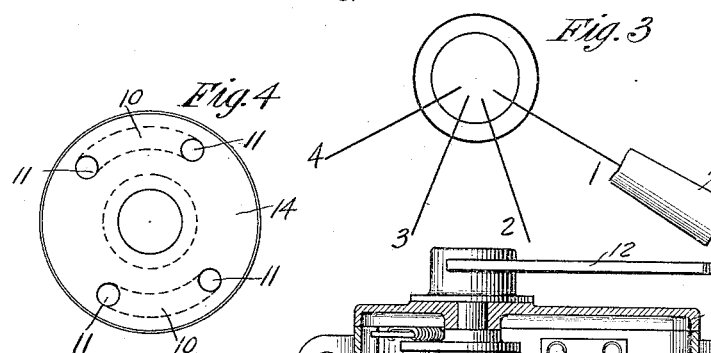
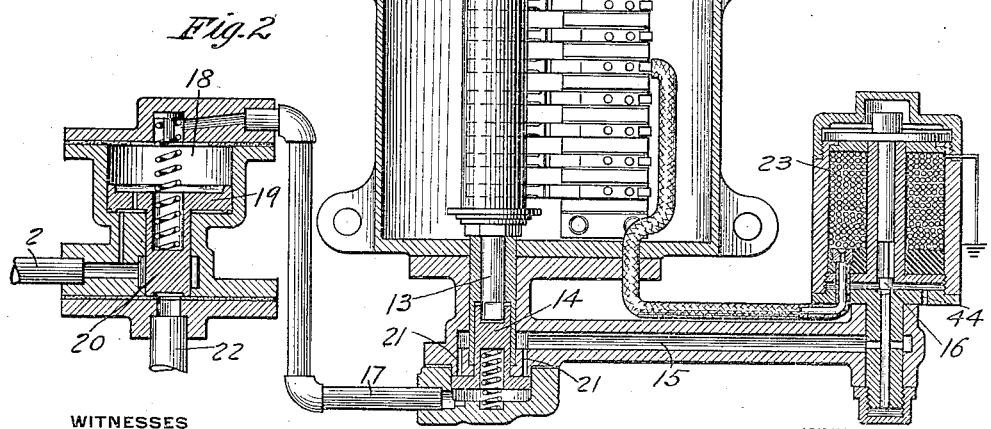
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO WESTINGHOUSE AIR BRAKE COMPANY, OF PITTSBURGH, PENNSYLVANIA, A CORPORATION OF PENNSYLVANIA.

ELECTROPNEUMATIC BRAKE DEVICE.

1,131,968.  Specification of Letters Patent.  Patented Mar. 16, 1915.

Application filed November 10, 1910. Serial No. 591,724.

*To all whom it may concern:*

Be it known that I, WALTER V. TURNER, a citizen of the United States, residing at Edgewood, in the county of Allegheny and State of Pennsylvania, have invented new and useful Improvements in Electropneumatic Brake Devices, of which the following is a specification.

This invention relates to electro-pneumatic brakes for traction and other cars in which pneumatic brakes may be either controlled by variations in train pipe pressure or electrically.

With brake systems of the above character it has been proposed to employ a normally energized electrically controlled device adapted when deënergized to effect an application of the brakes, so that upon failure of current the brakes will be automatically applied. It is desirable to provide some form of cut-out switch for the electric brake circuits, so that the circuits may be opened in case of necessity as where something goes wrong with the circuits or where a car is returned to the barns or is temporarily taken out of service. In opening the circuits, the circuit of the above mentioned electrically controlled device is also opened and this causes an application at a time when it is not desired.

The principal object of my invention is to obviate the above difficulty, and for this purpose I provide means operated upon movement of the cut-out switch to off or cut-out position for preventing the electrically controlled device from causing an application of the brakes.

In the accompanying drawing; Figure 1 is a diagrammatic view of an electro-pneumatic brake equipment for a car, with my improvement applied thereto; Fig. 2 a sectional view of a cut-out or master brake switch embodying my invention; Fig. 3 a diagram showing the different positions of the master brake switch handle; and Fig. 4 a plan view of the rotary valve employed in connection with the master brake switch.

The electro-pneumatic brake equipment may be of any desired type, such as that shown in Fig. 1 of the drawings, comprising a triple valve device 1, train pipe 2, brake cylinder 3, auxiliary reservoir 4, electric application and release magnets 5 and 6 respectively, and a combined brake valve and brake switch 7.

According to my invention, a cut-out or master brake switch 8 is provided having a drum 9 carrying contact segments for engagement with stationary contact fingers for the purpose of controlling the brake circuits leading to the controlling brake switch 7. One end of the drum 9 is provided with an operating handle 12 and the opposite end has a key extension 13 adapted to engage in a socket in a rotary valve 14. The valve 14 is provided with cavities 10 in its face having through ports 11 therefrom and in all positions of the handle 12 except off position said cavities are adapted to register with ports 21 in the rotary valve seat.

The ports 21 open into a passage 15, leading to valve 16 which is controlled by magnet 23 for releasing air from passage 15 to exhaust port 44. When ports 21 register with cavities 10, communication is opened from passage 15 to pipe 17 which leads to a chamber 18 on one side of a movable abutment 19. A vent valve 20 is adapted to be operated by the abutment 19 for controlling communication from train pipe 2 to an exhaust port 22. One terminal of the no-voltage magnet 23 is connected by a wire 24 to contact finger 25 in the master brake switch 8 and the other terminal is grounded through wire 26.

The application and release magnets 5 and 6 may have one terminal connected to ground and the other respective terminals to line wires 27 and 28.

An emergency circuit may also be provided for electrically effecting an emergency application of the brakes, such as supply wire 29 and emergency train wire 30 and any desired emergency device may be bridged across said wires which is adapted to effect an emergency application upon energization.

Wires 36, 37, and 38 connect contact fingers 39, 40, and 41 of the controlling brake switch with respective contact fingers 33, 34, and 35 of the master brake switch, a source of current is connected to contact finger 32, and wire 24 from the no-voltage magnet 23 is connected to contact finger 25 of the master brake switch.

The master brake switch has four positions; in position 4, all the circuits are made and this is the normal running position; in position 3, the supply wire 29 is disconnected from the source of current so that the emergency devices are cut out of action; in position 2, all the circuits are opened except the emergency circuit and the no-voltage magnet circuit; and in position 1 all of the circuits are open.

When the master brake switch is thrown to position 1 or the off position the valve 14 is rotated to a position in which communication is cut off from passage 15 to pipe 17. This also deënergizes the magnet 23 and opens valve 16, but the position of valve 14 prevents fluid from being vented from chamber 18, so that the vent valve 20 is not opened to vent air from the train pipe 2. It will thus be seen, that when the master brake switch is in any of its operating positions, the no-voltage magnet is effective upon deenergization to vent air from the abutment 19, but when the switch is opened, communication between the vent valve device and the no-voltage magnet is cut off and the deenergization of the magnet is not effective to operate the vent valve. Thus an application of the brakes is prevented at this time.

Having now described my invention, what I claim as new and desire to secure by Letters Patent, is:—

1. The combination with an electro-pneumatic brake apparatus, of a switch device for controlling the electric brake circuits, pneumatically operated means for effecting an application of the brakes, and means controlled by said switch device for cutting said pneumatically operated means out of action in the off position of said switch.

2. The combination with an electro-pneumatic brake apparatus, of a switch device for controlling the electric brake circuits, a valve device adapted to effect a pneumatic application of the brakes, and means adapted upon movement of said switch device to off position for preventing the operation of said valve device.

3. The combination with an electro-pneumatic brake apparatus, having electric circuits for controlling the brakes and a train pipe, a reduction in pressure in which is adapted to effect an application of the brakes, of a switch device for controlling the electric brake circuits, an automatic vent valve device adapted to vent air from the train pipe and means operated by the movement of said switch device for cutting said vent valve device out of action.

4. The combination with an electro-pneumatic brake apparatus having a valve device operated by a reduction in train pipe pressure for effecting an application of the brakes and electric circuits for controlling the brakes, of means for venting air from the train pipe, an electrically operated device normally energized and adapted upon deënergization to effect the operation of said means, and a switch device for controlling the electric brake circuits and adapted in one position to prevent the operation of said means.

5. The combination with an electro-pneumatic brake apparatus having a valve device operated by a reduction in train pipe pressure for effecting an application of the brakes, and electric circuits for controlling the brakes, of means for venting air from the train pipe, an electrically operated device normally energized and adapted upon deënergization to effect the operation of said means, and a switch device for controlling the electric brake circuits and adapted upon movement to off position to cut said means out of action.

6. The combination with a fluid pressure brake, of a no-voltage magnet device normally adapted to open a vent port independently of the position of the brake valve and effect a reduction in train pipe pressure upon deënergization, a switch for controlling the circuit of said no-voltage magnet, and means associated with said switch and adapted in off position to prevent said magnet device from effecting a reduction in train pipe pressure upon opening said vent port.

7. In an electro-pneumatic brake system, the combination with a pneumatic brake and electric circuits for controlling said brake to effect either a service or an emergency application of the brakes, and a controlling switch for said circuits, of a master switch device adapted in one position to connect up both the service and emergency circuits and in another position to open said service circuit and close said emergency circuit.

8. In an electro-pneumatic brake system, the combination with a pneumatic brake and electric circuits for controlling said brake to effect either a service or an emergency application of the brakes, and a controlling switch for said circuits, of a master switch having one position in which all circuits are open, another position in which the service circuit is open, and another position in which all circuits are closed.

9. In an electro-pneumatic brake system, the combination with a pneumatic brake and electric circuits for controlling said brake to effect either a service or an emergency application of the brakes, and a controlling switch for said circuits, of a master switch having one position for opening said service and said emergency circuit, another position for closing the service circuit and opening the emergency circuit, another position for closing the emergency circuit and opening the service circuit, and another position for closing said service and said emergency circuits.

10. The combination with a fluid pressure brake having a train pipe and a brake valve, of a no-voltage magnet adapted upon deënergization to effect a reduction in train pipe pressure to apply the brakes, a switch device for controlling the circuit of the no-voltage magnet, and a rotary valve operated by the movement of said switch for controlling a communication through which the magnet operates to effect a reduction in train pipe pressure.

11. The combination with a fluid pressure brake having a train pipe, of a vent valve device operated by a variation in fluid pressure for effecting a reduction in train pipe pressure, a no-voltage magnet adapted upon deënergization to vary the pressure on said vent valve device, a switch device for controlling the circuit of said no-voltage magnet, and a rotary valve operated by said switch and adapted in the open position of the switch to cut off communication from said no-voltage magnet to said vent valve device.

In testimony whereof I have hereunto set my hand.

WALTER V. TURNER.

Witnesses:
A. M. CLEMENTS,
CLYDE V. McCURDY.

Copies of this patent may be obtained for five cents each, by addressing the "Commissioner of Patents, Washington, D. C."